United States Patent [19]

Obayashi et al.

[11] Patent Number: 4,592,241

[45] Date of Patent: Jun. 3, 1986

[54] TORQUE DETECTOR

[75] Inventors: Hideki Obayashi, Okazaki; Tokio Kohama, Nishio; Toshikazu Ina, Nukata; Seiichi Narita, Chiryu, all of Japan

[73] Assignees: Nippon Soken, Nishio; Nippondenso Co., Ltd., Kariya, both of Japan

[21] Appl. No.: 529,865

[22] Filed: Sep. 7, 1983

[30] Foreign Application Priority Data

| Sep. 8, 1982 | [JP] | Japan | 57-156358 |
| Feb. 22, 1983 | [JP] | Japan | 58-28776 |
| Feb. 22, 1983 | [JP] | Japan | 58-28777 |
| May 10, 1983 | [JP] | Japan | 58-81397 |
| May 30, 1983 | [JP] | Japan | 58-95407 |

[51] Int. Cl.$^4$ .............................................. G01L 3/10
[52] U.S. Cl. ................................................ 73/862.34
[58] Field of Search ........... 73/862.34, 862.33, 862.08; 324/83 A

[56] References Cited

U.S. PATENT DOCUMENTS

| 2,592,796 | 4/1952 | Doussain | 73/862.33 |
| 2,616,290 | 11/1952 | Moore | 73/862.34 |
| 3,538,762 | 11/1970 | Parkinson et al. | 73/862.34 |
| 3,545,265 | 12/1970 | McIlraith et al. | 73/862.34 |
| 3,548,649 | 12/1970 | Parkinson | 73/862.34 |
| 4,135,390 | 1/1979 | Templin | 73/862.34 |
| 4,364,277 | 12/1982 | Rundell | 73/862.34 |
| 4,513,628 | 4/1985 | Kohama et al. | 73/862.34 |

FOREIGN PATENT DOCUMENTS

| 56-54324 | 5/1981 | Japan | 73/862.34 |
| 288360 | 1/1971 | U.S.S.R. | 73/862.33 |
| 700790 | 11/1979 | U.S.S.R. | 73/862.34 |
| 773463 | 10/1980 | U.S.S.R. | 73/862.34 |

*Primary Examiner*—Richard L. Chiesa
*Attorney, Agent, or Firm*—Cushman, Darby & Cushman

[57] ABSTRACT

A torque detector for detecting a torque applied to a torque transmission shaft which is connected to a load such as a wheel of an automobile. A first rotating body is connected to one end of a driving shaft of an engine coaxially, and an annular second rotating body is disposed around a boss which projects from the center of the first rotating body so as to be coaxial and parallel with the first rotating body. An elastic member connects the inner peripheral portion of the second rotating body to the boss in the radial direction. The angular phase difference between the first and the second rotating bodies which occurs due to the deformation of the elastic member is detected, and torque is calculated from the obtained angular phase difference.

13 Claims, 16 Drawing Figures

SMALL ← TORQUE → LARGE

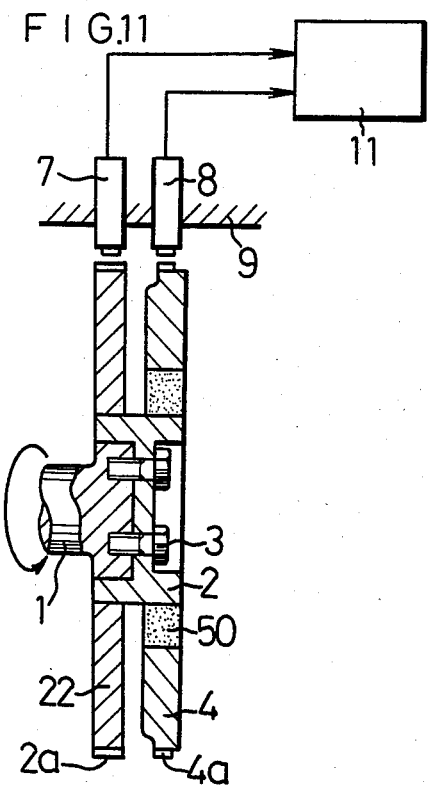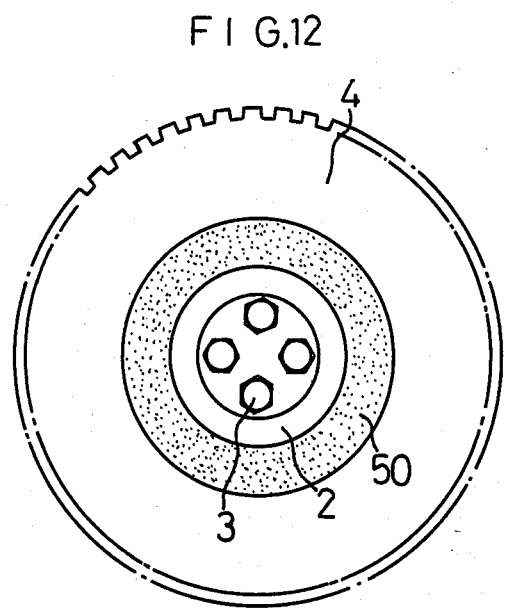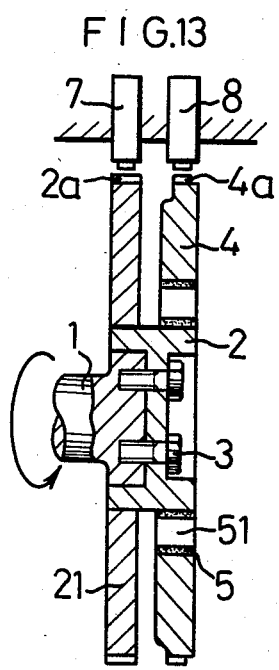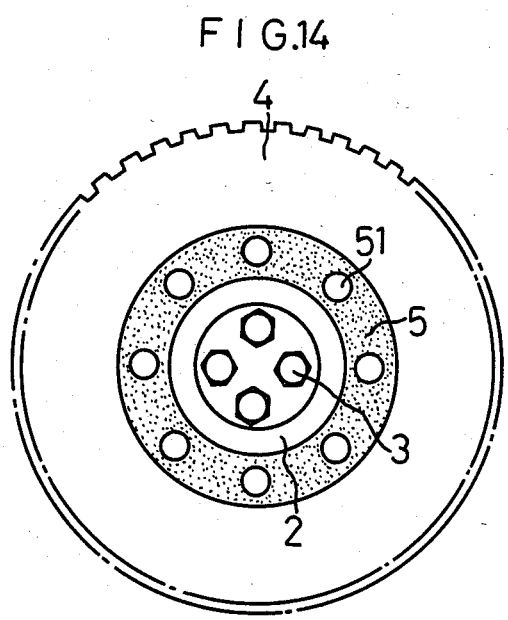

F I G.15
F I G.16
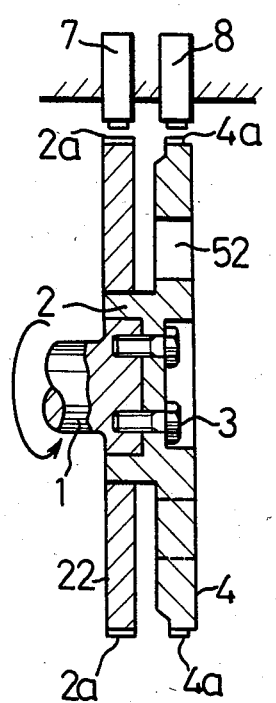
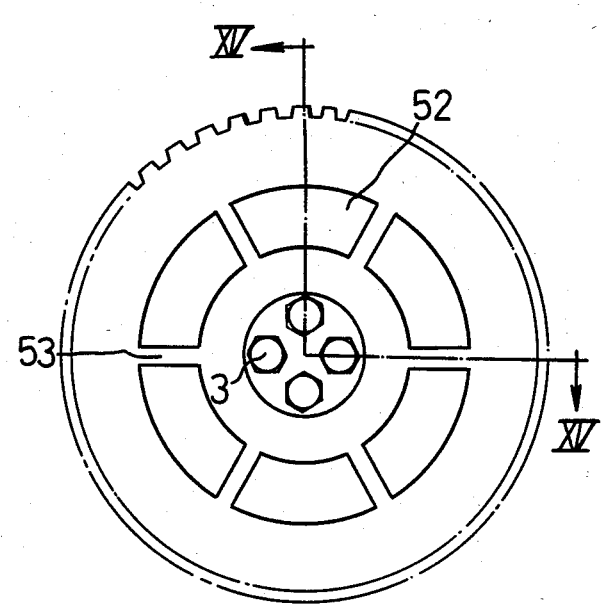

TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means: (1) of a strain gauge type comprising a strain gauge of which the electric resistance varies in proportion to the distortion, (2) of a magnetic strain type comprising a magnetic strain pipe of which the magnetic property varies in accordance with the distortion or (3) of a phase difference type, which detects a phase difference between the distortion occurring at two separated points of the detector shaft.

However, the conventional torque detector having the above structure is large in size and complex in structure. Also, in the conventional torque detector, the torque is detected by detecting distortion occurring in the detector shaft so that if the detector shaft is short, the accuracy of the detection is low. Therefore, in order to improve the accuracy of the detection, the detector shaft must be made long.

It has been required to control the ignition timing, the air-fuel ratio and the gear ratio of the transmission of the automobile in accordance with the torque applied to the load.

However, the above described conventional torque detector is too large and too complex in structure to be mounted on the automobile practically.

SUMMARY OF THE INVENTION

The torque detector of the present invention comprises a first rotating body which is connected to one end of a driving shaft of an engine coaxially, an annular second rotating body which is disposed around a boss which projects from the center of the first rotating body so as to be coaxial and parallel with the first rotating body, an elastic member for connecting the inner peripheral portion of the second rotating body to the boss in the radial direction, an angular phase difference detecting means for detecting the angular phase difference between the first and the second rotating bodies, which occurs due to the deformation of the elastic member when the first and the second rotating bodies are rotated, and a torque computing means for calculating torque from the obtained angular phase difference.

The torque detector of the present invention can be mounted on an automobile as a means for controlling the air-fuel ratio, the ignition timing and the gear ratio of the transmission thereof. In this case, a flywheel formed in the crank shaft can be used as the rotating bodies. The flywheel is divided into two parts which correspond to the first rotating body and the second rotating body, respectively, and the above two parts are connected to each other by means of the elastic member.

One object of the present invention is to provide a torque detector which is small in size and simple in structure enough to be mounted on an automobile.

Another object of the present invention is to provide a torque detector which detects torque with excellent accuracy.

Still another object of the present invention is to provide a torque detector which uses the flywheel formed in the crank shaft.

DETAILED DESCRIPTION OF THE DRAWINGS

FIG. 11 is a sectional view of a six embodiment of the torque detector according to the present invention;

FIG. 12 is a right side view of the sixth embodiment;

FIG. 13 is a sectional view of a seventh embodiment of the torque detector according to the present invention;

FIG. 14 is a right side view of the seventh embodiment;

FIG. 15 is a sectional view of an eighth embodiment of the torque detector according to the present invention; and FIG. 16 is a right side view of the eighth embodiment.

DETAILED DESCRIPTION

Figure 1:
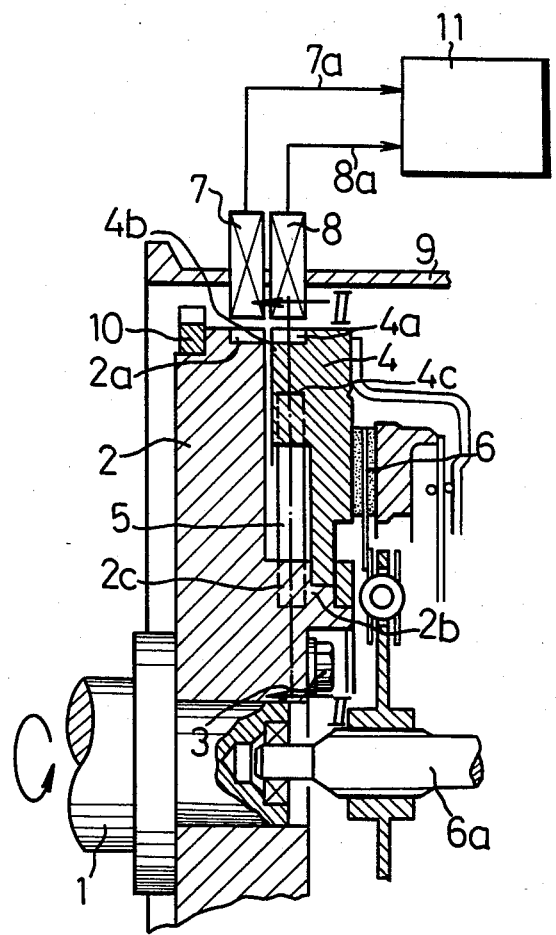
FIG. 1 is a sectional view of a first embodiment of a torque detector according to the present invention.
Figure 2:
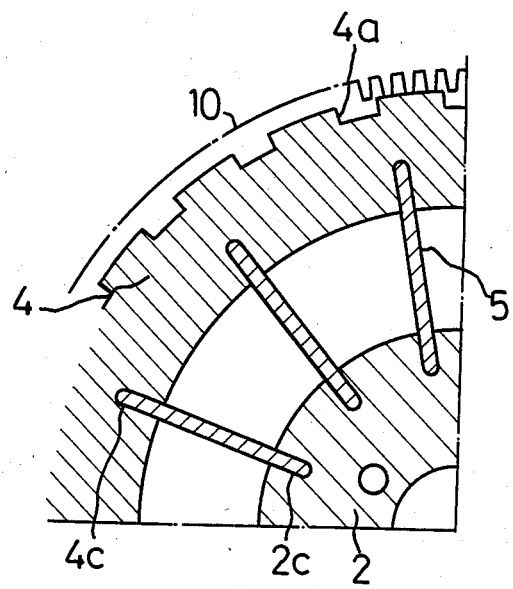
FIG. 2 is a partially cut away section view taken along the line II—II of FIG. 1.

FIGS. 1 to 2 illustrate a first embodiment of a torque detector according to the present invention.

To a top end of a rotating shaft (crank shaft) 1 of an internal combustion engine of an automobile (not shown), a first flywheel 2 acting as a first rotating body is connected by a plurality of bolts 3. From the central portion of the first flywheel 2, a boss 2b having a stepped outer peripheral surface, projects. A second flywheel 4 acting as a second rotating body is closely installed around the boss 2b coaxially so as to be rotated relative thereto and so as not to move in the axial direction thereof. The second flywheel 4 is connected to an input shaft 6a of a transmission through a clutch 6. The input shaft 6a is disposed coaxially with the crank shaft 1. The inertia moment and/or inertia mass of the second flywheel 4 is set smaller than that of the first flywheel 2.

The first flywheel 2 is connected to the second flywheel 4 in the radial direction thereof by means of a plurality of plate-shaped elastic members 5. In the inner peripheral surface of a ring-shaped projecting portion 4b of the second flywheel 4, which is opposed to the boss 2b of the first flywheel 2, a plurality of grooves 4c which extend in the radial direction and are arranged at regular intervals in the circumferential direction, are formed. In the outer peripheral surface of the boss 2b, a plurality of grooves 2c, each of which has the same shape as that of the groove 4c, are formed so as to be opposed to the grooves 4c. Into the grooves 4c, 2c, both ends of the plate-shaped elastic members 5 are closely inserted and fixed thereto. The elastic members 5 are made of special tool steel or elastic alloy such as Ni-Ti, Au-Cd, and Cu-Al-Ni alloy.

On the outer peripheral surface of the first flywheel 2, a plurality of teeth 2a are formed at equal pitches while on the outer peripheral surface of the second flywheel 4, a plurality of teeth 4a, each of which has the same shape as that of the tooth 2a, are formed at equal pitches. The first flywheel 2, the second flywheel 4, and the plate-shaped elastic member 5 are assembled so that the teeth 2a are opposed to the teeth 4a when the driven body is in no load state.

To a housing 9, electromagnetic pickups 7, 8 are secured so as to be opposed to the teeth 2a, and 4a, respectively. Each of the pickups 7, 8 generates electrical signals which vary in response to the passing of the teeth 2a or 4a of the rotating flywheels 2 or 4. These electrical signals are fed to a torque measuring unit 11 by way of the lead wires 7a, 8a. To the first flywheel 2, a ring gear 10 which is engaged with a driving gear (not shown) of a starter (not shown) is attached.

In operation, when an engine is rotated, the crank shaft 1 and the first flywheel 2 are integrally rotated in the direction of the arrow shown in FIG. 1. This rotating force is transmitted to the second flywheel 4 through the plate-shaped elastic members 5 to rotate the second flywheel 4.

When the clutch 6 is cut off, no load is applied to the second flywheel 4 so that the deforming amount of the elastic members 5 is small.

When the clutch 6 is connected, the load applied to the second flywheel 4 increases so that the deforming amount of the elastic members 5 increases in proportion to the applied load. As a result, the phase difference in proportion to the above described deforming amount occurs between the first flywheel 2 and the second flywheel 4.

The second flywheel 4 rotates in the same direction as that of the first flywheel 2. As the load applied to the second flywheel 4 increases, the rotating angle of the second flywheel 4 lags as compared with the rotating angle of the first flywheel 2 due to the deformation of the elastic members 5. The lagging amount is in proportion to the deforming amount of the elastic members 5, that is the transmitted torque.

When the engine is decelerated, torque is transmitted from the second flywheel 4 on the driven side to the first flywheel 2 on the driving side. Therefore, the elastic members 5 deform in the direction opposite to the direction of the above case. As a result, the rotating angle of the second flywheel 4 leads the rotating angle of the first flywheel 2.

The electrical signals generated by the electromagnetic pickups 7, 8, are alternating voltage signals, each of which pulsates due to the passing of the teeth 2a, 4a of the flywheels 2, 4. By comparing the phase of two alternating voltage signals with each other, the above described lagging angle can be measured. The torque measuring unit 11 waveshapes the electrical signals of the electromagnetic pickups 7, 8 into rectangular wave pulse signals. By measuring the lead or lag in phase between two pulse signals, the deforming amount of the elastic members 5 can be detected. Then, the torque measuring unit 11 converts the deforming amount into the value of transmitted torque in accordance with the characteristics of the elastic members 5. Also, the torque measuring unit 11 decides whether the transmitted torque is positive or negative from the condition of the phase difference between the above pulse signals.

Figure 3:
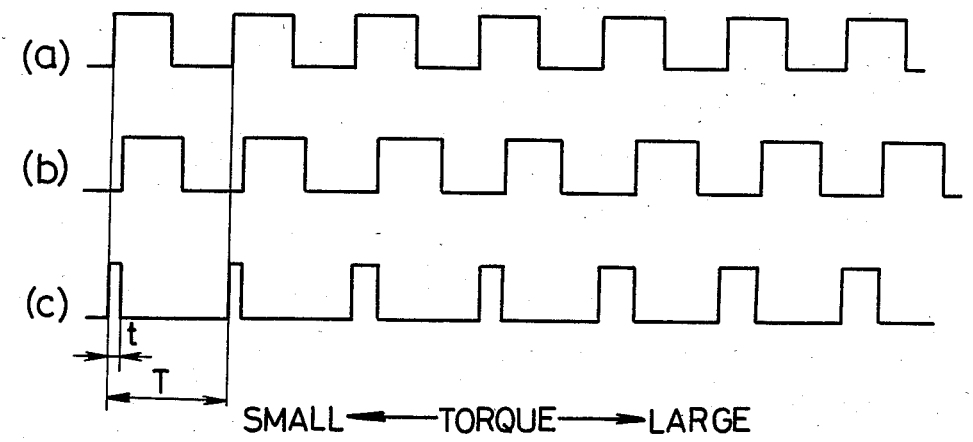
FIG. 3 is a diagram showing the waveform of the pulse signals generated by the electromagnetic pickups of the torque detector according to the present invention and the phase difference between the above waveforms.

FIG. 3 explains the theory of the above measurement. In this diagram, (a) shows the pulse signal which are obtained by wave-shaping the electrical signal generated by the electromagnetic pickup 7, and (b) shows the pulse signals which are obtained by wave-shaping the electrical signal generated by the electromagnetic pickup 8. The torque measuring unit 11 measures the phase difference t between the tising of two pulse signals. (c) shows this phase difference. Furthermore, the torque measuring unit 11 calculates the period T of one of two pulse signals. Then, the torque measuring unit 11 calculates the ratio of the phase difference t to the period T. This ratio t/T is in proportion to the phase difference $\theta$ between two rotating bodies, which occurs due to the deformation of the elastic members 5. By multiplying the above ratio t/T by a predetermined constant (=deformation→torque converting coefficient), th applied torque is obtained.

FIG. 3 shows the case where the positive torque is applied.

In contrast, when negative torque is applied, the electrical signal generated by the electromagnetic pickup 8 (shown in FIG. 3(b)) lead that generated by the electromagnetic pickup 7 (shown in FIG. 3(a)). In this case, the torque measuring unit 11 calculates (T−t)/T as the deforming amount and indicates negative mark.

Figure 4:
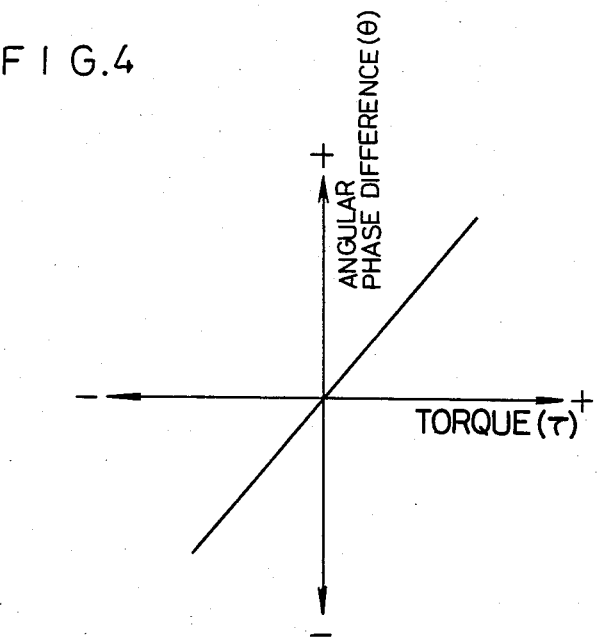
FIG. 4 is a view showing the relation between the phase difference between the rotating body on a driving side and the rotating body on a driven side, and the applied torque.

FIG. 4 shows the relation between the applied torque and the angular phase difference $\theta$.

Using the torque detector of the present invention, torque in various driving modes such as acceleration, deceleration, and normal driving region, can be detected.

The detected torque can be used for controlling the ignition timing of an interval combustion engine, air-fuel ratio or the like.

In this embodiment, the inertia moment and/or inertia mass of the second flywheel 4 is made smaller than that of the first flywheel 2, and the first flywheel 2 is connected to the second flywheel 4 by means of the elastic members 5.

Therefore, the resonance frequency of the crank shaft 1 can be prevented from being reduced and the amplitude of the torsion vibration can be prevented from increasing, so that the looseness of the flywheel-set bolts 3, the fatigue or damage of the crank shaft 1 or other problem such as reducing the reliability of an automobile can be prevented.

Figure 5:
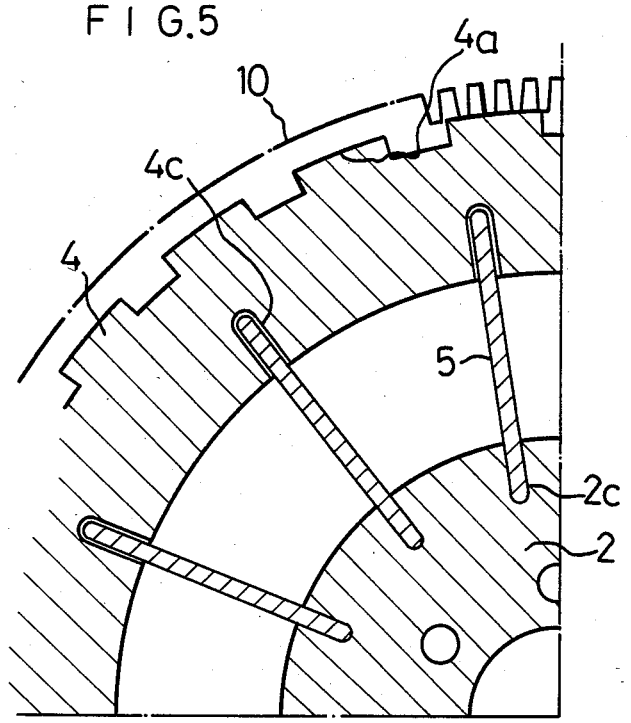
FIG. 5 is a partially cut away sectional view of a second embodiment of the torque detector according to the present invention.

FIG. 5 illustrates a second embodiment of the torque detector according to the present invention.

In the second embodiment, the width in the circumferential direction of each of the grooves 4c formed in the second flywheel 4 is made larger than the thickness of the plate-shaped elastic members 5. Into each of the grooves 4c, one end of the elastic member 5 is loosely inserted. According to the second embodiment, the deforming amount of the elastic members 5 can be made large as compared with the case where both ends of each of the elastic members 5 are tightly inserted into the grooves of the flywheels. Therefore, the detecting accuracy is improved. The other structure of the torque detector of the second embodiment is substantially equal to that of the first embodiment.

Figure 6:
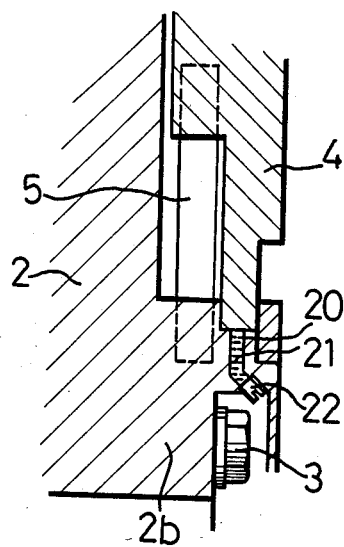
FIG. 6 is a partially cut away sectional view of a third embodiment of the torque detector acording to the present invention.

FIG. 6 illustrates a third embodiment of the torque detector according to the present invention. In the third embodiment, a narrow hole 20 is formed from the inner peripheral surface of the boss 2b to the outer peripheral surface thereof through the boss 2b. The end of the narrow hole 20 which opens at the inner peripheral surface of the boss 2b is closed by a screw 22 and lubricant 21 such as grease and oil is charged within the narrow hole 20. Between the opposed sliding surfaces of the first and the second flywheels 2, 4, oil film is formed so that the wear-resistance of the sliding surfaces of the first and the second flywheels 2, 4 is improved.

Figure 7:
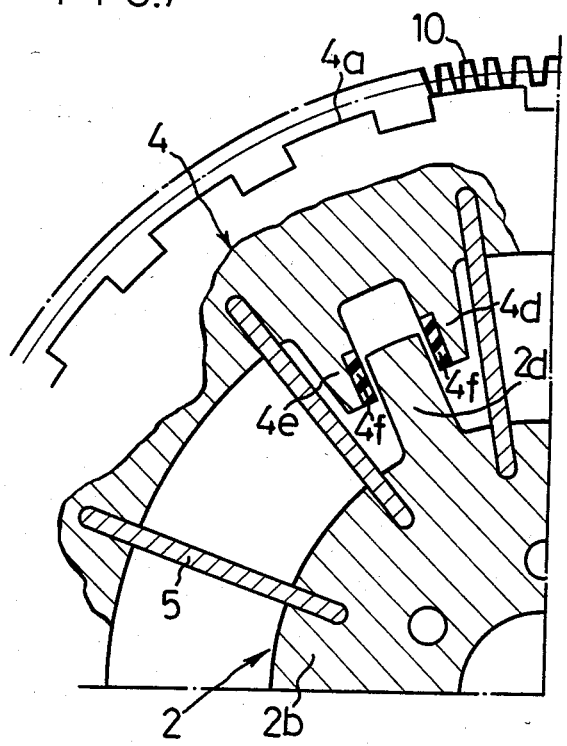
FIG. 7 is a partially cut away sectional view of a fourth embodiment of the torque detector according to the present invention.

FIG. 7 illustrates a fourth embodiment of the torque detector according to the present invention.

In the fourth embodiment, an engaging means 40 for engaging the first flywheel 2 with the second flywheel 4 when the load of the driven side reaches the allowed deforming amount of the plate-shaped elastic members 5, is provided.

The engaging means 40 comprises a pair of projecting portions 4d, 4e which project from the inner peripheral surface of the ring-shaped projecting portion 4b at a predetermined interval, and a projecting portion 2d which projects from the boss 2b of the first flywheel 2 into the space formed between the projecting portions 4d, 4e. The projecting portion 2d is positioned at the middle position of the projecting portions 4d, 4e when the deforming amount of the elastic members 5 is zero.

In operation, when the load of the driving side increases and reaches the allowed deforming amount of the elastic members 5, namely the phase difference between the first and the second flywheels 2, 4 reaches the allowed limit, the projecting portion 2d is in contact with the projecting portion 4d or 4e. Therefore, the elastic members 5 are prevented from being damaged due to the excess deformation thereof.

To the surface of each of the projecting portions 4e, 4d, which is opposed to the projecting portion 2d, an elastic member 4f made of rubber or the like is attached. The elastic member 4f prevents the occurrance of such noise that is generated when the projecting portion 2d is in direct contact with the projecting portions 4d, 4e.

Figure 8:
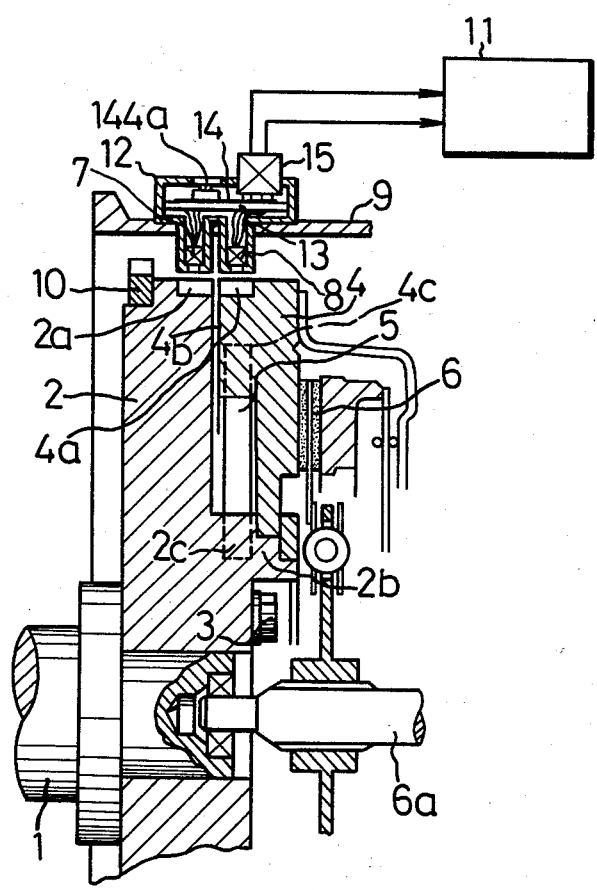
FIG. 8 is a sectional view of a fifth embodiment of the torque detector according to the present invention.
Figure 9:
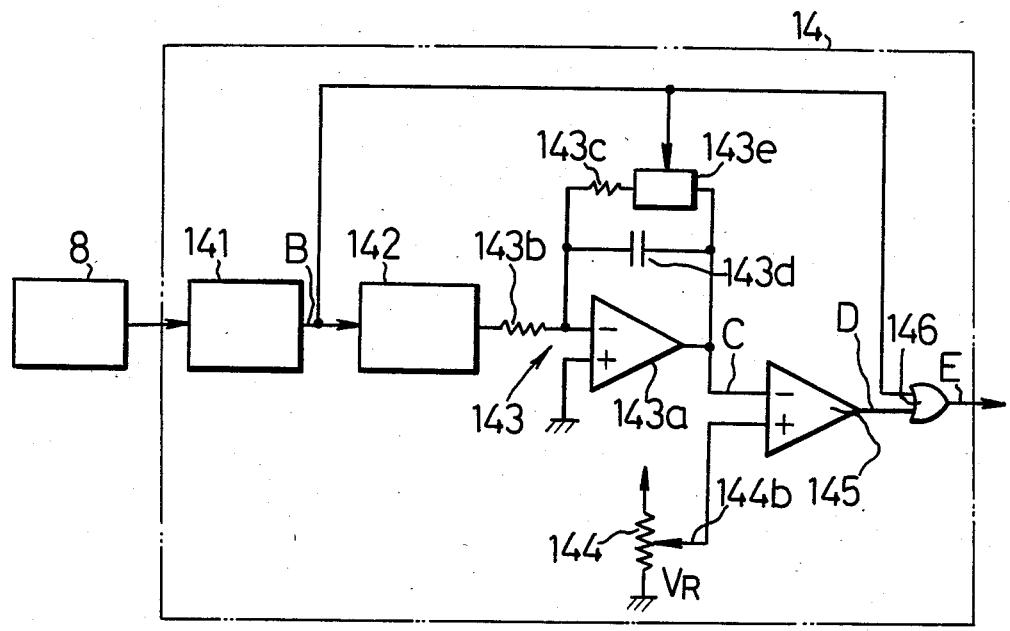
FIG. 9 is a diagram of a phase adjusting circuit employed in the fifth embodiment.
Figure 10:
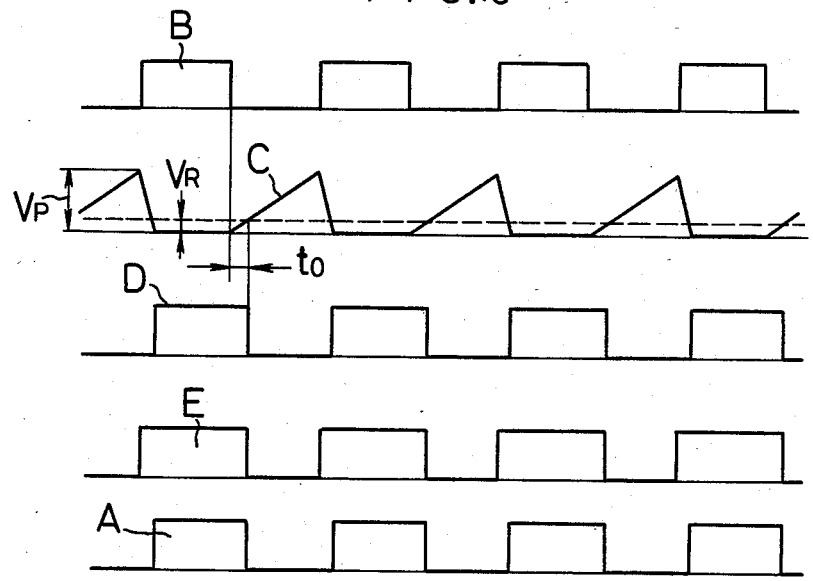
FIG. 10 is a diagram of signals generated by components of the phase adjusting circuit of FIG. 9.

FIGS. 8 to 10 illustrate a fifth embodiment of the torque detector according to the present invention. When the first flywheel 2 and the second flywheel 4 are assembled, error in assembly is not apt to occur, so that the initial phase difference differs between every torque detector. The torque detector of the fifth embodiment is provided with an adjusting means for adjusting the initial phase difference into a desired value.

A casing 12 provided with a pair of cylindrical portions is attached to the housing 9. Within the top end of each of the cylindrical portions, the electromagnetic pickups 7, 8 are disposed so as to be opposed to the teeth 2a, 4a of the first flywheel 2 and the second flywheel 4, respectively.

On a printed circuit board 13 assembled within the casing 12, a phase adjusting circuit 14 is formed. The phase adjusting circuit 14 is provided with a wave-shaping circuit 141, a frequency-voltage converter (hereinafter will be called F-V converter) 142, and a saw toothed wave signal generating circuit 143 as shown in FIG. 9. The wave-shaping circuit 141 wave-shapes the electrical signal fed from the electromagnetic pickup 8 into the pulse signal B as shown in FIG. 10. The F-V converter 142 converts the frequency of the pulse signal B fed from the wave-shaping circuit 141 into analogue voltage which is in proportion to the above frequency. The saw-toothed wave signal generating circuit 143 is provided with an operational amplifier 143a, resistors 143b, 143c, a condensor 143d, and an analogue switch 143e. When the pulse signal B fed from the wave-shaping circuit 141 is 「0」 level, the analogue switch 143e is cut off to form a charging circuit composed of the resistor 143b and the condensor 143d. When the pulse signal B is 「1」 level, the analogue switch 143e is in conduction to form a discharging circuit composed of the resistor 143c and the condensor 143d, which has a time constant smaller than that of the charging circuit. The operational amplifier 143a forms the rising portion of the saw-toothed wave signal C upon receiving the analogue voltage from the F-V converter 142 when the charging circuit is formed, and forms the falling portion thereof when the discharging circuit is formed. The charging speed of the charging circuit is in proportion to the output voltage of the F-V converter 142 while the charging time thereof is in inverse proportion to the frequency of the pulse signal B from the wave-shaping circuit 141. Therefore, by properly setting the constant of proportion and inverse proportion, the peak value $V_P$ of the saw-toothed wave signal C can be made constant regardless of the frequency of the pulse signal B.

A phase adjustor 144 is composed of a potentiometer. By adjusting an adjusting screw 144a shown in FIG. 8, a phase adjusting voltage $V_R$ is obtained at a slider 144b. A comparator 145 compares the saw-toothed wave signal C with the phase adjusting voltage $V_R$ and produces rectangular wave signal D when the level of the saw-toothed wave signal C is lower than that of the phase adjusting voltage $V_R$. In this case, the falling of the rectangular wave signal D lags behind the falling of the pulse signal B fed from the wave-shaping circuit 141, namely, the rising of the saw-toothed wave signal C fed from the circuit 143 by the phase difference $t_0$ as shown in FIG. 10. The rotating angle difference $\theta_0$ corresponding to this phase difference $t_0$ is constant regardless of the variation in frequency of the pulse signal B. An OR gate 146 generates corrected pulse signal E upon receiving the pulse signal B from the wave-shaping circuit 141 and the rectangular wave signal D from the comparator 145. In this case, the falling of the corrected pulse signal E coincides with the falling of the rectangular wave signal D.

In FIG. 8, the reference numeral 11 designates a torque measuring unit which is connected to the OR gate 146 through a connector 15. This unit 11 acts as the pulse phase difference detecting means and the converting means. The other structure of the sixth embodiment is substantially equal to that of the first embodiment.

In operation, when the crank shaft 1 and the first flywheel 2 are rotated in non-engaging condition of the clutch 6, the rotating force is transmitted to the second flywheel 4 through the elastic members 5. At this time, since no load is applied to the crank shaft 1, the elastic members 5 are not deformed. However, because of the deviation of the teeth 2a from the teeth 4a due to the error in assembling the flywheels 2, 4, and the error in performance of the electromagnetic pickups 7, 8, the phase difference $t_0$ as shown in FIG. 10 often occurs between the falling of the pulse signal A fed from the wave-shaping circuit 141 connected to the pickup 7 and that of the pulse signal B from the wave-shaping circuit 141 connected to the pickup 8. In this case, by adjusting the phase adjusting voltage $V_R$ fed from the phase adjustor 144 by means of the adjusting screw 144a, the intersection of the saw-toothed wave signal C fed from the circuit 143 and the phase adjusting voltage $V_R$ is properly adjusted. As a result, the comparator 145 generates a rectangular wave signal D of which the falling coincides with that of the pulse signal A and then the corrected rotating angle signal E of which the falling coincides with that of the pulse signal A and the rising coincides with that of the pulse signal B is generated.

When the clutch 6 is connected and load applied to the crank shaft 1 increases, the elastic members 5 deform so that the phase difference between the teeth 2a, 4a of the flywheels 2, 4 increases. As a result, the phase difference t occurs between the falling of the pulse signal A and that of the corrected pulse signal E.

The torque measuing unit 11 detects the phase difference t between the pulse signal A and the corrected pulse signal E, calculates the torque $\tau$ which corresponds to the angular phase difference $\theta$ in accordance with the relation $\tau = K_1(t/T) = K\theta$ ($\tau$ is torque ) and generates a torque signal.

Since the falling of the pulse signal B is previously adjusted so as to coincide with that of the pulse signal A in no load condition, the value $\tau$ of the obtained torque signal is in proportion to the deforming amount of each of the elastic members 5 with accuracy.

As described above, by adjusting the phase adjustor 144, the phase difference $t_0$ in no load condition can be easily and precisely made zero, regardless of the rotating speed of the first flywheel 2, so that the applied torque can be calculated accurately.

In addition, since the above described phase adjustment can be performed after assembling the flywheels 2, 4, a high accuracy of the formation of the teeth of the flywheels 2, 4 and a high accuracy of the assembly of the flywheels 2, 4 are not required. Therefore, the processing cost can be reduced and time and trouble in assembling the flywheels 2, 4 can be saved.

Furthermore, the phase adjustor 144 is disposed within the casing 12 which is attached to the housing 9 so as to be easily adjusted outside of the casing 12. Therefore, the phase adjustment can be easily performed while observing the rotating state of the flywheels 2, 4 after the torque detector is assembled.

In the preceding embodiments, the phase difference between the falling of the pulse signal A and that of the pulse signal B is detected. Instead, the phase difference between the rising of two signals A, B may be detected. In this case, the phase adjustor 144 generates saw-toothed wave signal while the pulse signal B is ⌐L⌐ level and the phase adjusting circuit 14 generates the corrected pulse signal E simultaneously with the rising of the signal A.

In the preceding embodiments, the phase difference between two pulse signals A, B in no load state is previously adjusted into zero. Instead, the above phase difference may be previously adjusted into a predetermined value.

Furthermore, in the preceding embodiments, the detecting signal from the electromagnetic pickup 8 is phase-adjusted. Instead, the phase of the detecting signal from the electromagnetic pickup 7 may be adjusted.

FIGS. 11 and 12 illustrate a sixth embodiment of the torque detector according to the present invention.

In the sixth embodiment, to the top end of the crank shaft 1, a first rotating body 2 is coaxially fixed by means of bolts 3. Around the first rotating body 2, a circular plate 22 is coaxially mounted nad an annular second rotating body 4 is disposed so as to be opposed to the circular plate 22. The annular second rotating body 4 is connected to a clutch of a transmission.

The first rotating body 2 is radially connected to the second rotating body 4 by an annular elastic member 50. The connection of the elastic member 50, and the first rotating body 2 and that of the elastic member 50 and the second rotating body 4 are performed by engaging serrations formed in the contact surfaces thereof, with each other, for example. The elastic member 50 can be made of alloy having excellent elasticity such as Ni-Ti alloy, Au-Cd alloy and Cu-Al-Ni alloy, for example.

On the outer peripheral surface of the circular plate 22 and the second rotating body 4, teeth 2a, 4a are formed, respectively. Electromagnetic pickups 7, 8 are secured to the housing 9 so as to be opposed to the teeth 2a, 4a, respectively. The pickups 7, 8 are connected to the torque measuring unit 11.

In operation, when the crank shaft 1 is rotated, the first rotating body 2 is rotated therewith and the rotating force is transmitted to the second rotating body 4 by means of the elastic member 50. As the load applied to the second rotating body 4 increases, the deforming amount of the elastic member 50 increases. In proportion to this deforming amount , the phase difference between the first rotating body 2 and the second rotating body 4 varies. The variation of phase difference is detected by the electromagnetic pickups 7, 8. As a result, the applied torque is detected by the same means as the first embodiment.

FIGS. 13 and 14 illustrate a seventh embodiment of the torque detector according to the present invention. In the seventh embodiment, holes 51 are formed in the annular elastic member 5 in the circumferential direction at regular intervals. By changing the position and the size of the holes 51, the torsional strength of the elastic member 5 can be arbitraily selected. The other structure of the seventh embodiment is substantially equal to the sixth embodiment.

FIGS. 15 and 16 illustrate an eighth embodiment of the torque detector according to the present invention. In the seventh embodiment, the first rotating body 2 and the second rotating body 4 form one body. A plurality of fan-shaped holes 52 are formed in the second rotating body 4 in the circumferential direction at equal intervals. The other structure of the seventh embodiment is equal to that of the fifth embodiment. Between adjacent holes 52, a thin-walled portion 53 of which the thickness in the circumferential direction is smaller than the thickness of the second rotating body 4, is formed. The integral rotating bodies 2, 4 are made of elastic alloy such as Ni-Ti alloy, Au-Cd alloy and Cu-Al-Ni alloy. In the seventh embodiment, the thin-walled portions 53 are deformed due to the applied load, so that phase difference occurs between the central portion and the outer peripheral portion of the integral rotating bodies 2, 4. As a result, the applied torque is detected.

As described above, the torque detector of the present invention is characterized in that torque is detected by interposing an elastic member between a rotating body on a driving side and a rotating body on a load side, and by detecting angular phase difference between both rotating bodies due to the deformation of the elastic member which occurs when a rotating force of the rotating body on the driving side is transmitted to the rotating body on the load side through the elastic member.

The torque detector of the present invention having the above described structure can be made remarkably small as compared with the conventional detector which detects torque by providing another shaft between the above two shafts coaxially and detecting the distortion occurring in another shaft.

Therefore, the torque detector of the present invention can be mounted on a vehicle.

In this case, a flywheel can be used as the rotating bodies. Namely, the flywheel is divided into a first flywheel to be connected to a crank shaft and a second flywheel to be connected to a load through a clutch. The first flywheel is connected to the second flywheel by means of the elastic member.

The torque detected by the torque detector according to the present invention, which is mounted on a vehicle, can be used for controlling the ignition timing and the air-fuel ratio of an engine and the gear ratio of a transmission.

What is claimed is:

1. A torque detector for detecting torque of a driving shaft of an internal combustion engine when the driving shaft is connected to a load, comprising:
   (1) a first rotating body which is coaxially and integrally connected to the driving shaft;
   said first rotating body having a substantially circular plate-shape and including a boss which projects therefrom;
   (2) a second rotating body, connected to the load, and arranged around said first rotating body so as to be coaxial therewith;
   said second rotating body having an annular plate-shape and being disposed around said boss so as to be coaxial therewith, in the vicinity of and substantially parallel with said first rotating body;
   (3) an elastic member for connecting said first rotating body to said second rotating body in the radial direction, said elastic member including a plurality of elastic plates which are radially disposed between said boss of said first rotating body and said second rotating body, said elastic plates being deformed in accordance with the load applied to said second rotating body when said first rotating body is rotated;
   the ends of each of said elastic plates being connected to said boss of said first rotating body and said second rotating body respectively;
   (4) angular phase difference detecting means for detecting an angular phase difference between said first rotating body and said second rotating body which occurs due to the deformation of said elastic member; and
   (5) torque computing means for calculating torque from said angular phase difference.

2. A torque detector according to claim 1, wherein:
said first rotating body is provided with grooves in the outer peripheral surface thereof;
said second rotating body is provided with grooves in the inner peripheral surface thereof; and
both said ends of each of said elastic plates are inserted into said grooves formed in said first rotating body and said second rotating body.

3. A torque detector according to claim 2, wherein:
the width of said grooves of one of said first rotating body and said second rotating body in the circumferential direction is substantially equal to the thickness of said elastic plate; and
the width of said grooves of the other rotating body in the circumferential direction is larger than the thickness of said elastic plate.

4. A torque detector according to claim 1, wherein:
said elastic member is made of metallic material which has excellent elasticity.

5. A torque detector according to claim 1, wherein:
said elastic member is made of material selected from the group consisting of Ni-Ti alloy, Al-Cd alloy and Cu-Al-Ni alloy.

6. A torque detector according to claim 1, wherein:
said first rotating body further includes a first stopper, and said second rotating body further includes a second stopper, said first and second stopper project in opposite directions to each other and come into contact with each other when the phase difference between said first and second rotating bodies reaches a predetermined value.

7. A torque detector according to claim 6, wherein:
on at least one of said stoppers of said first rotating body and said second rotating body, rubber is provided.

8. A torque detector according to claim 1, wherein:
said angular phase difference detecting means comprises:
pulse generating means for generating a pulse every predetermined rotating angle of each of said first and second rotating bodies;
pulse phase difference detecting means for detecting the phase difference between the generated pulses; and
converting means for converting said phase difference into the angular phase difference.

9. A torque detector according to claim 8, wherein said pulse generating means includes a plurality of teeth formed in the outer periphery of said first rotating body and said second rotating body at predetermined angles; and
two electromagnetic pickups which are provided so as to be opposed to said teeth of said rotating bodies, respectively.

10. A torque detector according to claim 1, wherein:
said torque detector further comprises phase difference adjusting means for adjusting the pulse phase difference to a predetermined value when no load is applied; and
said phase difference adjusting means is provided with: (a) saw-toothed wave signal generating means for generating a saw-toothed wave signal which linerally varies from zero volts to a predetermined voltage, simultaneously with one of the pulse signals which are generated when said first rotating body rotates or said second rotating body rotates, and (b) comparing means for comparing said saw-toothed wave signal with a standard voltage and generating a corrected pulse signal of which the rising or the falling lags behind or leads the pulse signal of the other rotating body by a predetermined phase difference.

11. A torque detector according to claim 10, wherein: said saw-toothed wave signal generating means operates simultaneously with the rising or falling of said pulse signal and a saw-toothed wave signal while said pulse signal is ⌈1⌋ level or ⌈0⌋ level.

12. A torque detector according to claim 11, wherein: said saw-toothed wave signal generating means includes a F/V (frequency-voltage) convertor which generates a voltage in proportion to the frequency of said pulse; and an integration circuit which is reset at the rising or falling of said pulse signal which integrates the voltage generated by said convertor while said pulse signal is ⌈1⌋ level or ⌈0⌋ level.

13. A torque detector according to claim 10, wherein: said comparing means generates a corrected pulse signal of ⌈1⌋ level when the voltage of said saw-toothed wave signal is larger or smaller than said standard voltage.

* * * * *